(12) United States Patent
Fraley et al.

(10) Patent No.: US 10,875,578 B1
(45) Date of Patent: Dec. 29, 2020

(54) X-FRAME CHASSIS FOR TRAILER

(71) Applicant: King Kutter, Inc., Winfield, AL (US)

(72) Inventors: J. Phillip Fraley, Winfield, AL (US); John W. Davis, III, Winfield, AL (US)

(73) Assignee: King Kutter II, Inc., Gallipolis, OH (US)

( * ) Notice: Subject to any disclaimer, the term of this patent is extended or adjusted under 35 U.S.C. 154(b) by 9 days.

(21) Appl. No.: 16/029,247

(22) Filed: Jul. 6, 2018

Related U.S. Application Data

(60) Provisional application No. 62/529,187, filed on Jul. 6, 2017.

(51) Int. Cl.
*B62D 21/06* (2006.01)
*B62D 63/08* (2006.01)

(52) U.S. Cl.
CPC ............. *B62D 21/06* (2013.01); *B62D 63/08* (2013.01)

(58) Field of Classification Search
CPC ........ B62D 21/06; B62D 63/08; B62D 21/00; B62D 53/06; B62D 63/062; B62D 21/20
USPC ......................................... 280/789, 793, 794
See application file for complete search history.

(56) References Cited

U.S. PATENT DOCUMENTS

| | | | | |
|---|---|---|---|---|
| 1,841,510 A * | 1/1932 | Van Ranst | ............. | B62D 21/06 280/794 |
| 2,065,005 A * | 12/1936 | Zabriskie | ............... | B62D 21/06 280/794 |
| 2,157,353 A * | 5/1939 | Sherman | ................ | B62D 21/06 280/794 |
| 2,163,694 A * | 6/1939 | Matthews | ............... | B62D 21/06 280/794 |
| 2,177,991 A * | 10/1939 | Maddock | ............... | B62D 21/06 280/794 |
| 2,844,864 A * | 7/1958 | Schilberg | .................. | E04C 3/06 29/897.35 |
| 3,239,274 A * | 3/1966 | Weiss | ..................... | B62D 21/14 298/17 R |

* cited by examiner

*Primary Examiner* — James A English
*Assistant Examiner* — Kurtis Nielson
(74) *Attorney, Agent, or Firm* — Angela Holt; Bradley Arant Boult Cummings LLP

(57) ABSTRACT

A trailer chassis is formed from a first main beam disposed diagonally to a longitudinal axis of the trailer and a second main beam disposed diagonally to the longitudinal axis of the trailer. The second main beam crosses with, or is intertwined with, the first main beam, to form a chassis in the shape of an X. The X-shaped chassis has a tighter turn radius and greater resistance to deflection and fracture than conventional trailers that have two main beams extending parallel to one another down the longitudinal axis of the trailer.

19 Claims, 6 Drawing Sheets

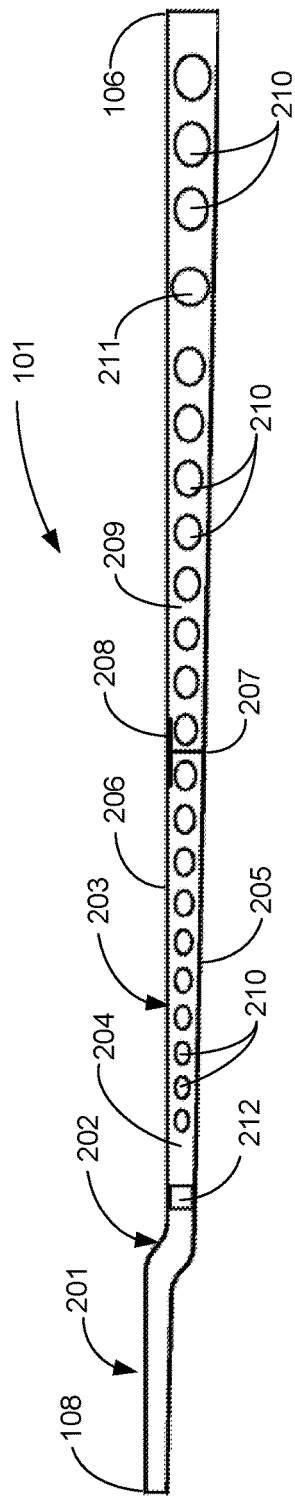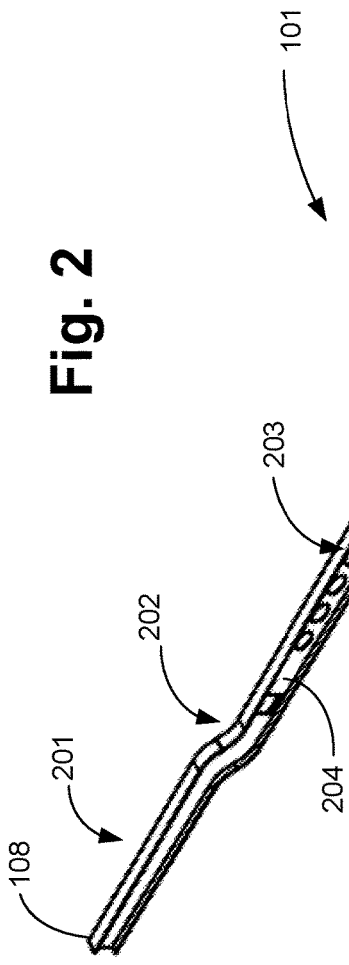
Fig. 2
Fig. 3

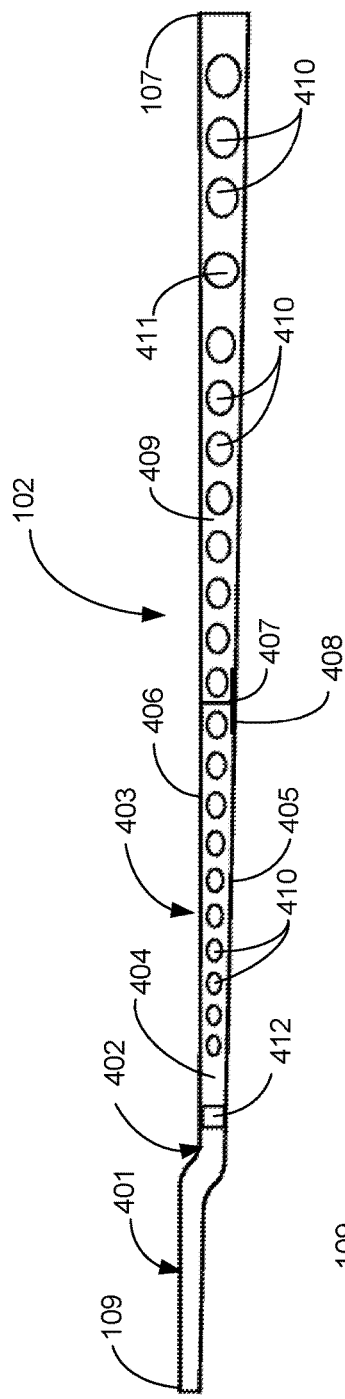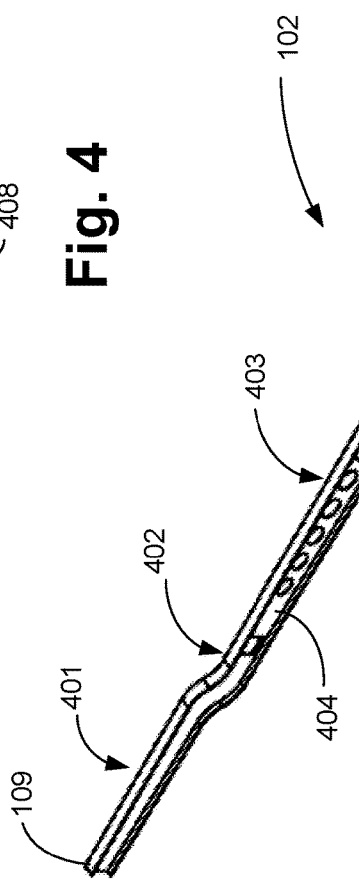
Fig. 4
Fig. 5

X-FRAME CHASSIS FOR TRAILER

CROSS REFERENCE TO RELATED APPLICATIONS

This application claims the benefit of U.S. Provisional Application No. 62/529,187 filed on Jul. 6, 2017, the entire contents of which are herein incorporated by reference.

BACKGROUND AND SUMMARY

Conventional trailers for semi-trucks have two main beams, parallel to each other, which extend longitudinally down the length of the trailer. The main beams provide the primary structural support for the trailer and its load. Such conventional trailers are well known to have a large turning radius. A chassis with main beams formed in the shape of an X provides a more direct force transfer path from the kingpin to the tires for tighter turns than is possible with the industry-standard parallel beams. This design also provides greater resistance to frame bending and fracture that conventional designs, thus allowing improved weight savings in frame design.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

FIG. 2 is a side plan view of a first main beam of an X-frame chassis.

FIG. 3 is a perspective view of the first main beam of FIG. 2.

FIG. 4 is a side plan view of a second main beam of an X-frame chassis.

FIG. 5 is a perspective view of the second main beam of FIG. 4.

DETAILED DESCRIPTION

Figure 1:
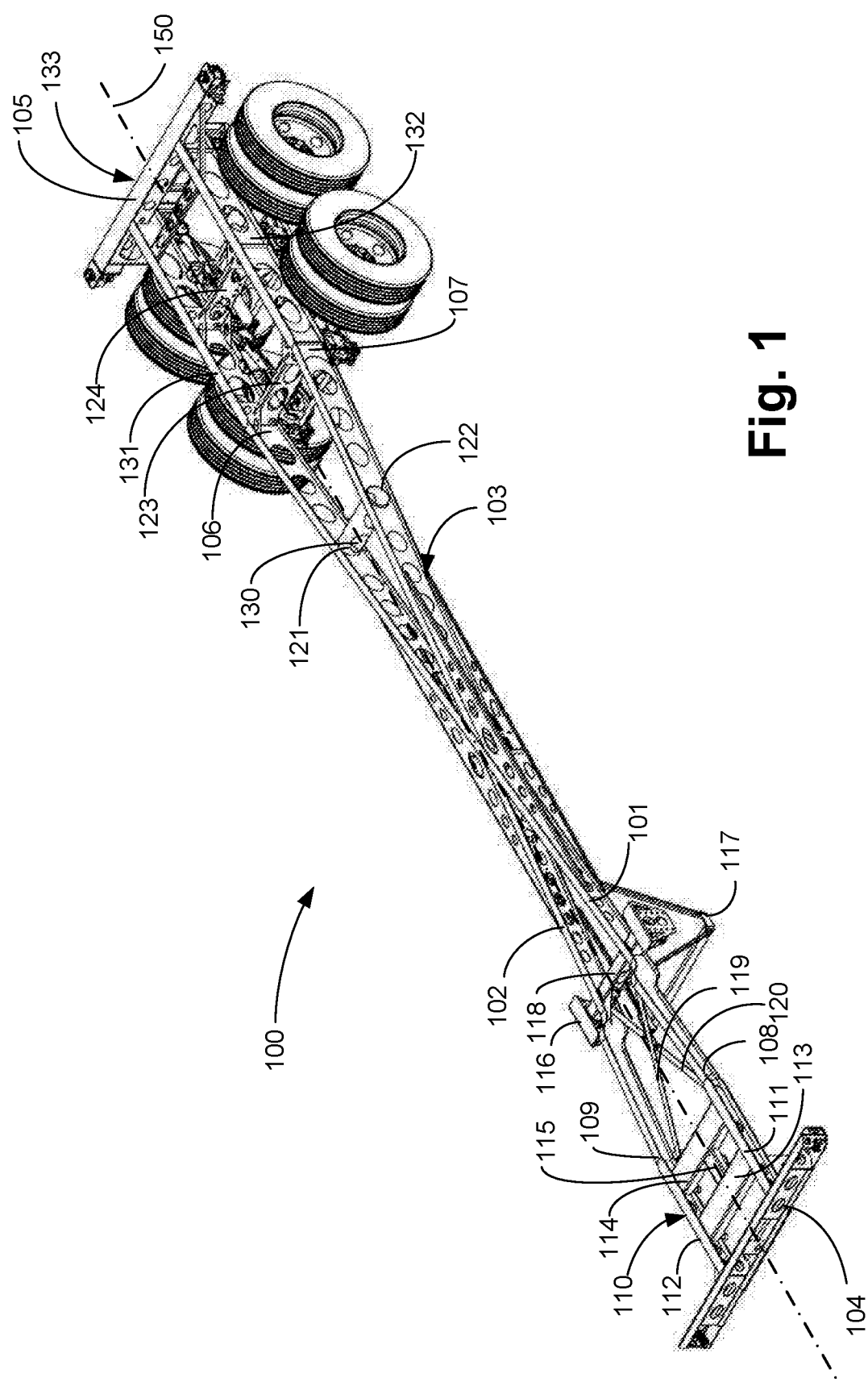
FIG. 1 is a perspective view of a trailer with an X-frame chassis according to an exemplary embodiment of the present disclosure.

FIG. 1 depicts a trailer 100 according to an exemplary embodiment of the present disclosure. The trailer 100 comprises a chassis 103 formed by a first main beam 101 and a second main beam 102. The first main beam 101 and second main beam 102 are each disposed diagonally to a longitudinal axis 150 of the trailer 100. In other words, the first main beam 101 and the second main beam 102 are each disposed at an angle to the longitudinal axis 150, the angle comprising between 3 and 20 degrees in one embodiment.

The first main beam 101 and second main beam 102 thus cross one another to form the shape of an "X," as further discussed herein. Conventional trailers, in contrast, have two parallel main beams that extend longitudinally down the length of trailer. The trailer 100 does not have two parallel main beams that extend longitudinally down the length of the trailer.

The chassis 103 extends from a front end support 104 to a rear end support 105. The front end support 104 is a part of a front end portion 118 of the trailer 1000. The front end support 104 extends horizontally and transversely along a front end of the trailer 100.

The front end portion 110 further comprises front beams 111 and 112, which extend between the front end support 104 and the beams 101 and 102. In this regard, right front beam 112 is rigidly affixed to the second main beam 102 and the front end support 104, and the left front beam 111 is rigidly affixed to the first main beam 101 and the front end support 104, spaced apart from and substantially parallel to the right front beam 112.

The front end portion 110 further comprises transverse supports 113 and 114 that extend between the right front beam 112 and the left front beam 111. The transverse supports 113 and 114 are spaced apart from one another, and a kingpin support 115 extends between the transverse supports 113 and 114. The kingpin support 115 supports the kingpin (not shown).

A rear end portion 133 of the trailer comprises the rear end support 105, which extends horizontally and transversely along a rear end of the trailer 100. The rear end portion 133 comprises right rear beam 131 and left rear beam 132. The rear beams 131 and 132 are spaced apart from one another and substantially parallel to one another on opposed sides of the trailer 100. The right rear beam 131 extends from a right side of the rear end support 105 to a rear end 106 of the first main beam 101. The left rear beam 132 extends from a left side of the rear end support 105 to a rear end 107 of the second main beam 102.

The first main beam 101 thus extends between the front left beam 111 and the right rear beam 131. The second main beam 102 extends between the front right beam 112 and the left rear beam 132.

The rear end portion 133 of the trailer 100 further comprises a first rear transverse support 123 that extends between the right rear beam 131 and the left rear beam 132. A second rear transverse support 124 extends between the right rear beam 131 and the left rear beam 132, rearward of the first rear transverse support 123. Each of the first and second rear transverse supports 123 and 124 comprise rectangular supports that are rigidly affixed to the beams 131 and 132.

A jackstand mount tube 118 extends between the first main beam 101 and second main beam 102 and supports a jackstand (not shown). The jackstand mount tube 118 has a rectangular cross-section and comprises a hollow rectangular tube. Jackstand mount plates 116 mount to opposed ends of the jackstand mount tube 118 outwardly from the first and second main beams 101 and 102 in a transverse direction. A jack frame 117 extends downwardly from the first main beam 101 and second main beam 102.

Cross supports 119 and 120 each extend between the first main beam 101 and the second main beam 102 in the neck portion (shown on FIG. 2) of the main beams 101 and 102. Cross supports 119 and 120 cross each other as shown. The cross supports 119 and 120 are rigidly attached to gussets (not shown) that are welded on a rear end to the jackstand mount tube 118 and beam web (not shown) on a on a front end to a kingpin ride plate (not shown).

A cross member pipe 121 extends between the first main beam 101 and the second main beam 102 near a rear end of the chassis 103. In this regard, the cross member pipe 121 is a tubular support that is welded on one end to the first main beam 101 and on the other end to the second main beam 102. The cross member pipe 121 fits within and is welded to a round opening 122 in the second main beam 102 and a substantially similar round opening (211, FIG. 2) in the first main beam 101. The cross member pipe 121 comprises cutout openings 130 that reduce the weight of the cross member pipe.

FIG. 2 is a side plan view of the first main beam 101 of FIG. 1. First main beam 101 comprises a neck portion 201, a transition portion 202, and a main portion 203. The neck portion 201 of the first main beam 101 is generally at the level of the fifth wheel (not shown) of the trailer (not shown), i.e. upward of the main portion 203 of the first main beam 101. The transition portion 202 angles down from the neck portion 201 to the main portion 203. The first main beam 101 extends from the front end 108 to the rear end 106. The main portion 203 of the beam gradually increases in vertical thickness along its length. In one embodiment, the thickness is 5" at a front end of the main portion and 12" at the rear end 106. The main beams 101 and 102 are generally flat on their top surface and slightly angled on their bottom surfaces, the slight angle approximately one degree in one embodiment.

The first main beam 101 further comprises an upper flange 206 and a lower flange 205, both of which extend continuously from the front end 108 of the first main beam 101 to the rear end 106 of the first mean beam 101. The upper flange 206 and the lower flange 205 are rigidly affixed together by a front beam web 204 and a rear beam web 209. The front beam web 204 and rear beam web 209 each comprise a plurality of openings 210 that extend through the web to reduce weight. The openings are elliptical in the illustrated embodiment. The round opening 211 receives and is welded to the cross member pipe 121, as discussed herein.

Figure 6:
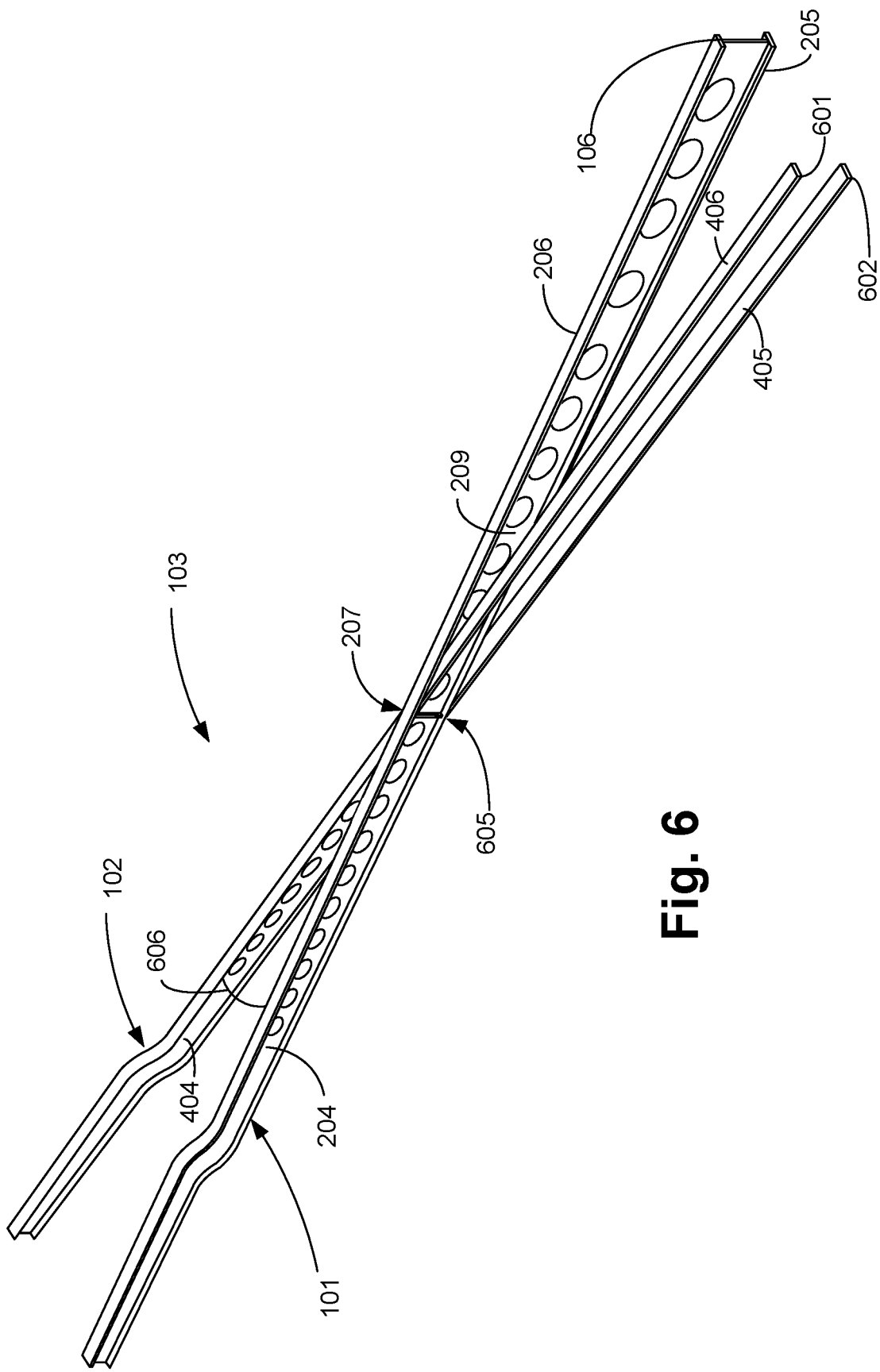
FIG. 6 is a perspective view of the first and second main beams during construction of an X-frame chassis.

The front beam web 204 and rear beam web 209 meet at an X-center point 207, which is where the first and second main beams 101 and 102 (FIG. 1) cross each other. The front beam web 204 is separated by a gap (not shown) from the rear beam web 209 in order to connect all webs from both beams to a center tie bar 605 (FIG. 6). The front beam web 204 and rear beam web 209 are welded to the upper flange 206 and lower flange 205 to form the beam 101.

An upper slit 208 is formed in an upper flange of the front beam web 204 and rear beam web 209, below the upper flange 206. The upper slit 208 receives an upper flange 406, FIG. 4) of the second main beam 102, which is threaded through the upper slit 108 during assembly of the X-frame chassis 103, as further discussed herein.

An opening 212 in the front beam web 204 receives the jackstand mount tube 118 (FIG. 1), which is welded to the front beam web 204 at the opening 212.

In one embodiment, the upper and lower flanges 206 and 205 are formed from 150 ksi steel, and the front beam web 204 and rear beam web 209 are formed from 80 ksi steel. In other embodiments, other materials of suitable strength and rigidity may be used.

FIG. 3 is a top perspective view of the first main beam 101 of FIG. 2. Note that the first main beam 101 is an I-beam, in that the upper flange 206, rear beam web 209, and lower flange 205 form an "I."

FIG. 4 is a side plan view of the second main beam 102 of FIG. 1. The second main beam 102 is generally a mirror image of the first main beam 101 (FIG. 2), with differences noted herein. The second main beam 102 comprises a neck portion 401, a transition portion 402, and a main portion 403. The neck portion 401 of the second main beam 102 is generally at the level of the fifth wheel (not shown) of the trailer (not shown), i.e. upward of the main portion 403 of the second main beam 102. The transition portion 402 angles down from the neck portion 401 to the main portion 403. The second main beam 102 extends from the front end 109 to the rear end 107. The main portion 403 of the second main beam 102 gradually increases in vertical thickness along its length. In one embodiment, the thickness is 5" at a front end of the main portion and 12" at the rear end 107.

The second main beam 102 further comprises an upper flange 406 and a lower flange 405, both of which extend continuously from the front end 109 of the second main beam 102 to the rear end 107 of the second main beam 102. The upper flange 406 and the lower flange 405 are rigidly affixed together by a front beam web 404 and a rear beam web 409. The front beam web 404 and rear beam web 409 each comprise a plurality of openings 410 that extend through the web to reduce weight. The openings 410 are elliptical in the illustrated embodiment. A round opening 411, aligned with the round opening 211 of the first main beam 101 (FIG. 2), receives and is welded to the cross member pipe 121 (FIG. 1), as discussed herein.

The front beam web 404 and rear beam web 409 meet at an X-center point 407, which is where the first and second main beams 101 (FIG. 1) and 102 cross each other. The front beam web 404 is welded to the rear beam web 409 at the X-center point 407. In the illustrated embodiment, the rear beam web 409 is not welded to the front beam web 404 or the upper and lower flanges 406 and 405 until after the second main beam 102 is crossed with the first main beam 101, as further discussed herein with respect to FIG. 6.

A lower slit 408 is formed in a lower flange 405 of the front beam web 404 and rear beam web 409, above the lower flange 405. The lower slit 408 receives the lower flange 205 (FIG. 2) of the first main beam 101, which is threaded through the lower slit 408 during assembly of the X-frame chassis 103, as further discussed herein with respect to FIG. 6.

An opening 412 in the front beam web 404 receives the jackstand mount tube 118 (FIG. 1), which is welded to the front beam web 404 at the opening 212. The opening 412 is aligned with the opening 212 in the front beam web 204 of the first main beam 101.

FIG. 5 is a top perspective view of the second main beam 102 of FIG. 4. Note that the second main beam 102 is an I-beam, in that the upper flange 406, rear beam web 409, and lower flange 405 form an "I."

FIG. 6 is a top perspective view of the first main beam 101 being joined with the second main beam during construction of the chassis 103 (FIG. 1). The first main beam 101 has been completely assembled at this point, in that the upper flange 206 and the lower flange 205 have been welded to the front beam web 204 and rear beam web 209. However, the rear beam web 409 (FIG. 4) has not been welded to the second main beam 102. Rather, the second main beam 102 comprises only the upper flange 406, the lower flange 405, and the front beam web 404. This configuration is required in order to thread the upper flange 406 of the second main beam 102 in between the upper flange 206 of the first main beam 101 and the front and rear beam webs 204 and 209 of the first main beam 101.

To assemble the X-frame chassis, a free end 601 of the upper flange 406 of the second main beam 102 is slid into the upper slit 208 (FIG. 2) of the first main beam 101. The upper slit 208 thus receives the upper flange 406. A free end 602 of the lower flange 405 of the second main beam 102 is slid beneath the remaining lower portion of the first main beam (i.e., below the webs 204 and 209 and lower flange 205 of the first main beam 101). Then the beams are manipulated until the lower flange 205 of the first main beam is fit within the lower slit 408 (FIG. 4) of the front beam web 404 and the X-center point 207 of the first main beam 101 is aligned with the X-center point 407 (FIG. 4) of the second main beam. At this point, the rear beam web 409 (FIG. 4) is welded to the upper flange 406 and lower flange 405 of the second main beam, thus completing the second main beam.

Further, a center tie bar 605 is welded to the webs 204, 209, 404, and 409 (FIG. 4) at the X-center point 207 to further secure the beams 101 and 102 together, and the center tie bar is welded to a lower side of the upper flange 406 of the second main beam and to an upper side of the lower flange 205 of the first main beam 101. The center tie bar 605 comprises a generally vertical bar with a rectangular cross section.

When assembled in this manner, the upper flange 406 of the second main beam 102 is disposed between the upper flange 206 of the first main beam 101 and the webs 204 and 209 of the first main beam 101 where the beams 102 and 101 cross each other. Further, the lower flange 205 of the first main beam 101 is disposed between the lower flange 405 of the second main beam and the webs 404 and 409 of the second main beam 102 where the beams 102 and 101 cross each other. In this manner, the beams are essentially intertwined together.

The first main beam 101 is at an angle 606 to the second main beam 102. In one embodiment, the angle 606 is substantially 12 degrees. In other embodiments, the angle 606 between the first main beam 101 and the second main beam 102 may be between 6 degrees and 40 degrees.

Figure 7:
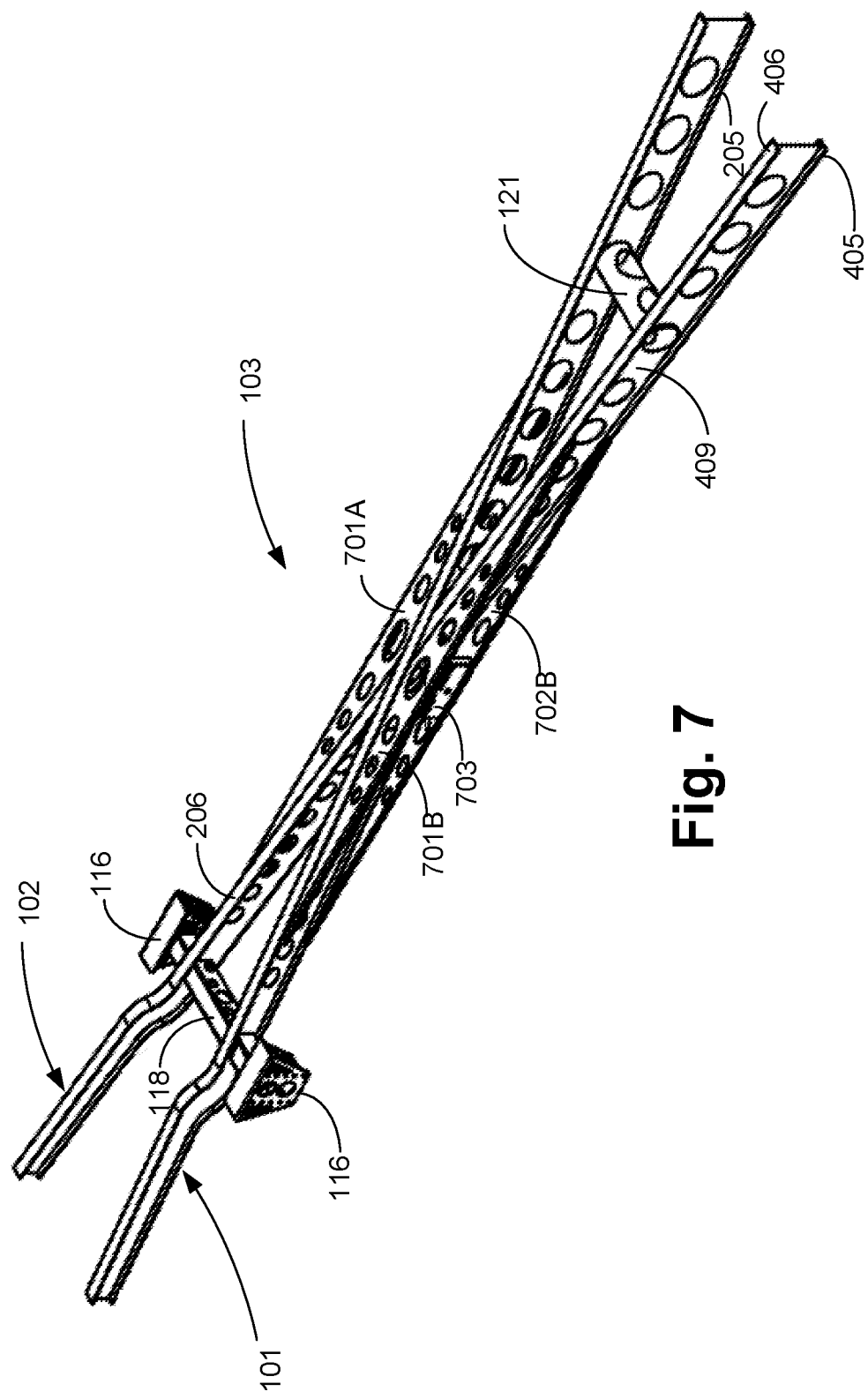
FIG. 7 is a perspective view of an X-frame chassis.

FIG. 7 is a top perspective view of the X-frame chassis 103 after the first main beam 101 and second main beam 102 have been fit together as discussed above. In this configuration, the rear beam web 409 has been welded in place between the upper flange 406 and lower flange 405 of the second main beam 102 to complete the second main beam 102. Further, the cross member pipe 121 has been aligned with the openings 211 and 411 (FIGS. 2 and 4, respectively) and welded into place between the first main beam 101 and the second main beam 102. The jackstand mount tube 118 has been aligned with the openings 212 and 412 (FIGS. 2 and 4, respectively) and welded into place between the first main beam 101 and the second main beam 102.

Upper flange plates 701A and 701B, one on each side of the chassis 103, are welded beneath the upper flanges 206 and 406. Specifically a right upper flange plate 701A is welded beneath the upper flange 206 at a right front side of the chassis 103 and beneath the upper flange 406 at a right rear side of the chassis. A left upper flange plate 701B is welded beneath the upper flange 406 at left front side of the chassis 103 and beneath the upper flange 206 at a left rear side of the chassis 103.

Lower flange plates 702A (not shown) and 702B, one on each side of the chassis 103, are welded above the lower flanges 205 and 405. Specifically a right lower flange plate 702A is welded above the lower flange 205 at a right rear side of the chassis 103 and above the right lower flange 405 at a right front side of the chassis 103. A left lower flange plate 702B is welded above the lower flange 205 at left front side of the chassis 103 and above the lower flange 405 at a left rear side of the chassis 103.

The upper flange plates 701A and 701B, and the lower flange plates 702A and 702B are each substantially similar, are triangular-shaped in the illustrated embodiment, and each comprises a plurality of openings 704 that serve to reduce weight. The flange plates 701A, 701B, 702A, and 702B serve to further secure the first main beam 101 and second main beam 102 together, and to further stiffen the chassis 103.

Figure 8:
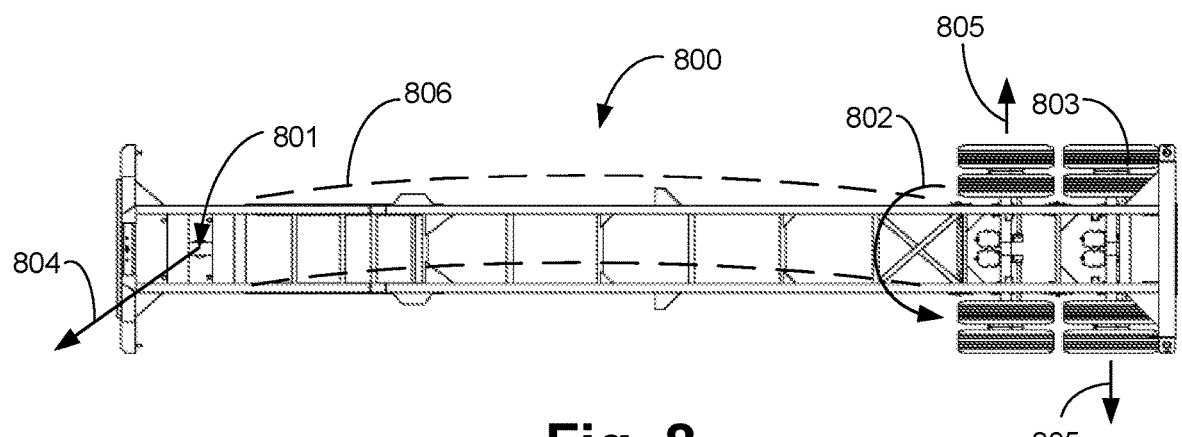
FIG. 8 illustrates the forces experienced by a conventional trailer during a left turn.

FIG. 8 illustrates the forces experienced by a conventional (prior art) trailer 800 during a left turn. The trailer 800 is pulled by a truck (not shown) via a kingpin (whose position is located at 801) in the direction of directional arrow 804. When pulled in this direction, the wheels 803 of the trailer 800 experience frictional resistance between the tires and the ground illustrated by directional arrows 805. The bending moment needed to overcome the frictional resistance (the bending moment illustrated by directional arrow 802) will induce a buckling effect in the parallel-beam frame of the trailer 800. Dotted lines 806 are an exaggeration of the trailer frame's displacement during turns.

Figure 9:
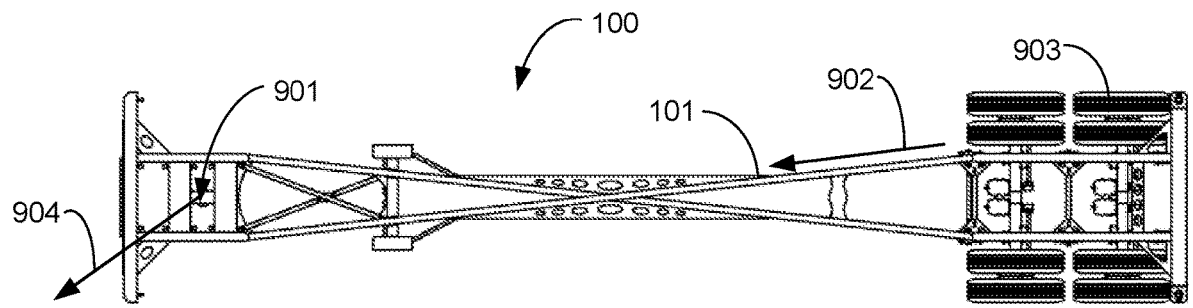
FIG. 9 illustrates the forces experienced by an X-frame trailer during a turn.

FIG. 9 illustrates the forces experienced by an X-frame trailer 100 according to the present disclosure. The X-frame chassis provides a more direct force transfer path from the kingpin 901 to the wheels 903 for tighter turns than are possible with the industry-standard parallel beams on the prior art trailers 800 (FIG. 8). When the trailer 100 is being pulled in the direction indicated by directional arrow 904, the force pulling the tires tends to be along the diagonal first main beam 101, in the direction of directional arrow 902. Below is the new design, with the same pulling and frictional forces. The force pulling the tandems around the turn is almost perfectly aligned with the beam 101, rather than placing a bending moment load on it.

What is claimed is:

1. A trailer chassis comprising:
    a first main beam, the first main beam disposed diagonally to a longitudinal axis of the trailer, the first main beam comprising an upper flange and a lower flange, the upper flange rigidly affixed to the lower flange via a first beam web, the first beam web comprising a front beam web portion and a rear beam web portion;
    a second main beam, the second main beam disposed diagonally to the longitudinal axis of the trailer, the second main bean comprising an upper flange and a lower flange, the upper flange rigidly affixed to the lower flange via a second beam web, the second beam web comprising a front beam web portion and a rear beam web portion, the second main beam crossing the first main beam to form a chassis in the shape of an X;
    a center tie bar extending between a lower side of the upper flange of the second main beam and an upper side of the lower flange of the first man beam at the center of the X, the center tie bar rigidly affixed to each of: the front beam web portion of the first main beam, the rear beam web portion of the first main beam, the front beam web portion of the second main beam, and the rear beam web portion of the second main beam.

2. The trailer chassis of claim 1, wherein the upper and lower flanges each extend continuously down a length of the first and second main beams.

3. The trailer chassis of claim 1, wherein the upper flange of the second main beam is disposed between the upper flange and the beam web of the first main beam where the second main beam crosses the first main beam.

4. The trailer chassis of claim 3, wherein the lower flange of the first main beam is disposed between the lower flange of the second main beam and the beam web of the second main beam where the second main beam crosses the first main beam.

5. The trailer of claim 1, the trailer further comprising a front end portion comprising a right front beam and a left front beam, the right front beam and left front beam spaced apart from one another on opposed sides of the trailer and substantially parallel to one another, and substantially parallel to the longitudinal axis of the trailer.

6. The trailer of claim 5, the trailer further comprising a rear end portion comprising a right rear beam and a left rear beam, the right rear beam and left rear beam spaced apart from one another on opposed sides of the trailer and substantially parallel to one another, and substantially parallel to the longitudinal axis of the trailer.

7. The trailer of claim 6, wherein the second main beam extends between the right front beam and the left rear beam, and wherein the first main beam extends between the left front beam and the right rear beam.

8. A trailer chassis comprising:
a first main beam, the first main beam disposed diagonally to a longitudinal axis of the trailer;
a second main beam, the second main beam disposed diagonally to the longitudinal axis of the trailer, the second main beam crossing the first main beam to form a chassis in the shape of an X, the first and second main beams each comprising an upper flange and a lower flange, the upper flange rigidly affixed to the lower flange via a beam web,
wherein the upper flange of the second main beam is disposed between the upper flange and the beam web of the first main beam where the second main beam crosses the first main beam, and
wherein the lower flange of the first main beam is disposed between the lower flange of the second main beam and the beam web of the second main beam where the second main beam crosses the first main beam, and
wherein the beam web of the first main beam comprises a slit between the upper flange and the beam web, the slit receiving the upper flange of the second main beam.

9. The trailer of claim 8, wherein the beam web of the second main beam comprises a slit between the lower flange and the beam web, the slit receiving the lower flange of the first main beam.

10. A trailer chassis comprising:
a first main beam, the first main beam disposed at an angle to a longitudinal axis of the trailer, the first main beam extending from a front end portion of the chassis to a rear end portion of the chassis;
a second main beam, the second main beam disposed at an angle to the longitudinal axis of the trailer, the second main beam extending from the front end portion of the chassis to the rear end portion of the chassis, the second main beam intertwined with the first main beam such that the first main beam and the second main beam form an X, the trailer comprising no other main beams extending longitudinally from the front end portion of the chassis to the rear end portion of the chassis.

11. The trailer chassis of claim 10, wherein the angle between the longitudinal axis of the trailer and the first main beam and the angle between the longitudinal axis of the trailer and the second main beam is between 3 and 20 degrees.

12. The trailer chassis of claim 10, the first and second main beams each comprising an upper flange and a lower flange, the upper flange rigidly affixed to the lower flange via a beam web.

13. The trailer chassis of claim 12, wherein the upper and lower flanges each extend continuously down a length of the first and second main beams.

14. The trailer chassis of claim 13, wherein the upper flange of the second main beam is disposed between the upper flange and the beam web of the first main beam where the second main beam crosses the first main beam.

15. The trailer chassis of claim 14, wherein the lower flange of the first main beam is disposed between the lower flange of the second main beam and the beam web of the second main beam where the second main beam crosses the first main beam.

16. The trailer of claim 15, wherein the beam web of the first main beam comprises a slit between the upper flange and the beam web of the first main beam, the slit receiving the upper flange of the second main beam, and wherein the beam web of the second main beam comprises a slit between the lower flange and the beam web of the second main beam, the slit receiving the lower flange of the first main beam.

17. The trailer of claim 10, the front end portion comprising a right front beam and a left front beam, the right front beam and left front beam spaced apart from one another on opposed sides of the trailer and substantially parallel to one another, and substantially parallel to the longitudinal axis of the trailer.

18. The trailer of claim 17, the rear end portion comprising a right rear beam and a left rear beam, the right rear beam and left rear beam spaced apart from one another on opposed sides of the trailer and substantially parallel to one another, and substantially parallel to the longitudinal axis of the trailer.

19. The trailer of claim 18, wherein the second main beam extends between the right front beam and the left rear beam, and wherein the first main beam extends between the left front beam and the right rear beam.

* * * * *